United States Patent
Sekine

(10) Patent No.: US 11,370,986 B2
(45) Date of Patent: Jun. 28, 2022

(54) SLIDING MATERIAL COMPOSITION, SLIDING MOLDED ARTICLE, AND SLIDING MEMBER

(71) Applicant: RIKEN TECHNOS CORPORATION, Tokyo-to (JP)

(72) Inventor: Yoshiyuki Sekine, Tokyo-to (JP)

(73) Assignee: RIKEN TECHNOS CORPORATION, Tokyo-to (JP)

( * ) Notice: Subject to any disclaimer, the term of this patent is extended or adjusted under 35 U.S.C. 154(b) by 0 days.

(21) Appl. No.: 17/264,980

(22) PCT Filed: Aug. 6, 2019

(86) PCT No.: PCT/JP2019/031012
§ 371 (c)(1),
(2) Date: Feb. 1, 2021

(87) PCT Pub. No.: WO2020/032075
PCT Pub. Date: Feb. 13, 2020

(65) Prior Publication Data
US 2021/0324286 A1     Oct. 21, 2021

(30) Foreign Application Priority Data
Aug. 7, 2018   (JP) .............................. JP2018-148889

(51) Int. Cl.
*C10M 107/04*    (2006.01)
*C10M 155/02*    (2006.01)
*C10M 169/04*    (2006.01)
*C10N 50/08*     (2006.01)

(52) U.S. Cl.
CPC ........ *C10M 107/04* (2013.01); *C10M 155/02* (2013.01); *C10M 169/041* (2013.01); *C10M 2205/0206* (2013.01); *C10M 2205/0225* (2013.01); *C10M 2229/02* (2013.01); *C10N 2050/08* (2013.01)

(58) Field of Classification Search
CPC .............. C10M 107/04; C10M 155/02; C10M 169/041; C10M 2205/0206; C10M 2205/0225; C10M 2229/02; C10N 2050/08; C08K 5/5415; C08L 23/06; C08L 53/00
See application file for complete search history.

(56) References Cited

U.S. PATENT DOCUMENTS

| | | | |
|---|---|---|---|
| 2007/0237922 A1* | 10/2007 | Miyakawa | B60J 10/16 428/122 |
| 2008/0167421 A1 | 7/2008 | Yalvac et al. | |
| 2009/0176045 A1* | 7/2009 | Kanae | C08L 23/02 428/35.7 |
| 2010/0240818 A1* | 9/2010 | Walton | C08L 67/00 524/505 |
| 2013/0237652 A1* | 9/2013 | Kulshreshtha | C08L 23/04 524/232 |
| 2014/0227518 A1* | 8/2014 | Kishimoto | H01B 3/441 428/394 |
| 2016/0200881 A1* | 7/2016 | Matsumura | C08L 23/16 523/351 |
| 2020/0010653 A1* | 1/2020 | Yamaguchi | C08L 23/06 |
| 2020/0190301 A1* | 6/2020 | Yamamoto | C08L 91/00 |

FOREIGN PATENT DOCUMENTS

| | | |
|---|---|---|
| CN | 1246135 | 3/2000 |
| JP | 6-344472 | 12/1994 |
| JP | 2000-38513 | 2/2000 |
| JP | 2000-109702 | 4/2000 |
| JP | 2002-514244 | 5/2002 |
| JP | 2003-213141 | 7/2003 |
| JP | 2005-248077 | 9/2005 |
| JP | 2007-529617 | 10/2007 |
| JP | 2013-36040 | 2/2013 |
| WO | 98/26001 | 6/1998 |

OTHER PUBLICATIONS

International Search Report (ISR) dated Oct. 15, 2019 in International (PCT) Application No. PCT/JP2019/031012.
International Preliminary Report on Patentability and Written Opinion of the International Searching Authority dated Feb. 9, 2021 in International (PCT) Application No. PCT/JP2019/031012.
Office Action dated Jan. 12, 2022 in corresponding Chinese Patent Application No. 201980052296.2, with English language translation.
Office Action dated Feb. 25, 2022, in corresponding Japanese Patent Application No. 2018-148889, with English translation.

* cited by examiner

*Primary Examiner* — Ellen M McAvoy
(74) *Attorney, Agent, or Firm* — Wenderoth, Lind & Ponack, L.L.P.

(57) ABSTRACT

A sliding material composition comprising a polymer component comprising (A) a high-density polyethylene and (B) an olefin block copolymer; and (C) a silane coupling agent; wherein the Si content is 0.1 to 15% by mass based on the mass of the entire sliding material composition. The sliding material composition has the same level of slidability as a resin to which particles are added.

8 Claims, No Drawings

SLIDING MATERIAL COMPOSITION, SLIDING MOLDED ARTICLE, AND SLIDING MEMBER

BACKGROUND OF THE INVENTION

Field of the Invention

The present invention relates to a sliding material composition and more particularly to a composition comprising a polymer component comprising a high-density polyethylene and an olefin block copolymer, and a silane coupling agent. The present invention also relates to a molded article obtained by melt-kneading the sliding material composition and more particularly to a sliding member suitably used for a member for an automobile or a member for a building.

Background Art

A weather strip or a glass run of an automobile is a long automobile interior part having a sealing property, which is attached to the outer frame of a door or a body of an automobile in order to avoid rainwater or outside air or to block noise.

In order to exhibit such function, the portion of the weather strip or the glass run in contact with the door glass is generally composed of a sliding material containing an elastomer, and examples of the sliding material used in this case include a coating-curable type material such as a urethane-based coating material, and a material obtained by adding various additives to an olefin resin and the like (Patent Document 1). In addition, in order to further improve slidability, there is also a material in which by adding crosslinkable particles to a resin, concavity and convexity are formed on the surface of a molded article to provide slidability (Patent Document 2).

PRIOR ART DOCUMENTS

Patent Literatures

Patent Document 1: Japanese Patent Application Laid-Open Publication No. H6-344472
Patent Document 2: Japanese Patent Application Laid-Open Publication No. 2003-213141

SUMMARY OF THE INVENTION

[Problem to be Solved by the Invention]

However, since a hot water treatment, etc. is required for the crosslinking reaction when the crosslinkable particles are added, there was a problem that the manufacturing process becomes complicated. In addition, the weather strip and the glass run formed of such a sliding material have a problem that the material easily cracks due to external stimulation such as bending by repeated use, and furthermore, the crack portion turns white, which adversely affects the appearance.

[Means for Solving the Problem]

As a result of intensive studies on the above problem, the present inventors have found that a molded article having the same level of slidability as a resin to which particles such as silicone powder are added can be realized by melt-kneading a composition comprising a polymer component comprising a specific high-density polyethylene and an olefin block copolymer, and a silane coupling agent in a predetermined ratio. Such composition is characterized by comprising a high-density polyethylene, an olefin block copolymer, and a silane coupling agent in a predetermined ratio and having a predetermined Si content. Further, the present inventors have found that silane-grafting a polymer component comprising a high-density polyethylene and an olefin block copolymer is effective in imparting slidability. The present invention is based on such finding.

The sliding material composition according to the present invention comprises:
 a polymer component comprising:
 (A) a high-density polyethylene; and
 (B) an olefin block copolymer; and
 (C) a silane coupling agent;
 wherein the Si content is 0.1 to 15% by mass based on the mass of the entire sliding material composition.

In an embodiment of the present invention, the polymer component preferably comprises (A) 65 to 85% by mass of the high-density polyethylene and (B) 15 to 35% by mass of the olefin block copolymer.

In an embodiment of the present invention, the (A) high-density polyethylene preferably comprises (A1) a powder raw material.

In an embodiment of the present invention, the sliding material composition preferably further comprises (D) a silicone powder.

In an embodiment of the present invention, the sliding material composition preferably further comprises (F) a silanol condensation catalyst.

In another embodiment of the present invention, there is also provided a sliding molded article comprising the sliding material composition.

In another embodiment of the present invention, there is also provided a sliding member comprising the sliding molded article.

In another embodiment of the present invention, the sliding member is a member for an automobile or a member for a building.

DETAILED DESCRIPTION OF THE INVENTION

[Effect of the Invention]

According to the present invention, a sliding molded article having the same level of slidability as a resin to which particles such as silicone powder are added can be achieved by melt-kneading a sliding material composition comprising a polymer component comprising a specific high-density polyethylene and an olefin block copolymer, and a silane coupling agent. Further, according to the present invention, since the crosslinking reaction is unnecessary, there is no necessity of a post-treatment such as a hot water treatment, providing an effect that the manufacturing process is simplified. Therefore, the sliding molded article of the present invention can be suitably used for, for example, a weather strip or a glass run for an automobile, as an alternative material of a resin to which particles such as silicone powder are added.

[Mode for Carrying out the Invention]

A sliding material composition according to the present invention comprises, as essential components, a polymer component comprising (A) a high-density polyethylene and (B) an olefin block copolymer, and (C) a silane coupling agent. Hereinafter, each component constituting the sliding material composition according to the present invention will be described.

<(A) High-Density Polyethylene>

The (A) high-density polyethylene used in the sliding material composition according to the present invention is an ethylene polymer obtained using various catalysts such as Ziegler-based catalysts and chromium-based catalysts by various polymerization methods such as a gas phase method, a solution method, and a suspension polymerization method, under medium to low pressure or under high pressure, and the high-density polyethylene according to the present invention has a density of 0.940 to 0.967 g/cm$^3$.

The high-density polyethylene has an extremely low glass transition temperature (Tg) as compared with other polymers, and therefore has excellent low temperature characteristics. In addition, since almost no tertiary carbon is contained, radicals are less generated, and thermal stability is excellent with less possibility of deteriorating during molding process, and also weather resistance is excellent. In addition, since it is nonpolar like other polyolefins, water vapor barrier property and water resistance are excellent, and it has a characteristic that the physical properties hardly change in water.

The (A) high-density polyethylene is not particularly limited as long as the effect of the present invention can be exhibited, and one kind can be used alone or two kinds in combination.

The melt index of the high-density polyethylene according to the present invention is usually 0.05 to 1.0 g/10 min, preferably 0.1 to 1.0 g/10 min.

As for the high-density polyethylene in the present invention, a commercially available product can also be used, and for example, they are commercially available under the product names HI-ZEX 5000H, 5305E, HI-ZEX 6300E, etc. from Prime Polymer Co., Ltd.

The amount of the (A) high-density polyethylene is usually 65 to 85% by mass, preferably 70 to 85% by mass, and more preferably 70 to 80% by mass, based on the total mass of the component (B) below. When the blending amount of the (A) high-density polyethylene is within the above range, the slidability can be improved while maintaining a good appearance during extrusion molding.

In order to improve the slidability more, the (A) high-density polyethylene may contain (A1) a powder raw material. The (A1) powder raw material is a powder form of the high-density polyethylene, and it can improve the slidability more efficiently as compared with an ordinary high-density polyethylene in a pellet form. Further, such powder raw material may be used after sintering without being completely melted. The use of the sintered powder raw material allows the formation of concavity and convexity on the surface of the molded article, and as a result, slidability, particularly sliding durability, can be further improved.

The optional ingredient of the (A1) powder raw material is commercially available, and for example, Sunfine SH810, Sunfine SH821, etc. from Asahi Kasei Corporation are commercially available.

The amount of the optional ingredient, (A1) powder raw material is not particularly limited, and is usually 3 to 15% by mass and preferably 5 to 10% by mass, from the viewpoint of improving slidability while maintaining a good appearance during extrusion molding.

<(B) Olefin Block Copolymer>

The (B) olefin block copolymer used in the sliding material composition according to the present invention is an olefin block copolymer comprising a crystalline polymer block (hard segment) mainly composed of ethylene and an amorphous polymer block (soft segment) comprising at least one α-olefin selected from α-olefins having 3 to 30 carbons and ethylene, wherein the latter ethylene portion is preferably less than in the hard segment, and preferably has a multi-block structure wherein each block is alternately connected to each other by two or more blocks and preferably three or more blocks. Further, although there are a linear structure and a radial structure, a linear structure is particularly preferred. In the present invention, the block copolymer obtained by hydrogenating the butadiene-based copolymer by 80% or more is excluded.

Conventionally, an ethylene and α-olefin copolymer synthesized by a metallocene catalyst has been a random copolymer obtained by random copolymerization of ethylene and α-olefin. On the other hand, the olefin block copolymer used in the present invention is different in respect that it is a block copolymer as described above. Examples of the block copolymer include a block copolymer obtained by hydrogenating a block copolymer composed of butadiene by 80% or more, for example, DYNARON CEBC manufactured by JSR Corporation Co., Ltd., where the C portion is a polyethylene block (hard segment) which is a hydrogenated 1,4-polybutadiene block, and the EB portion is a block (soft segment) having a random structure of ethylene and butylene to which a compound having a random structure of 1,4-butadiene and 1,2-butadiene is hydrogenated; however, this is not preferable because slidability, sliding durability, bend-whitening resistance, and extrusion workability are poor.

As for the olefin block copolymer of the present invention, use can be made to commercially available products, and there are products available under the product names: INFUSE D9000, D9007, D9100, D9107, D9500, D9507, D9530, D9817, D9807, etc. from Dow Chemical Company.

The (B) olefin block copolymer used in the present invention can also be synthesized according to the method disclosed in Japanese Patent Application Laid-Open Publication No. 2007-529617. For example, it is possible to produce through the steps of preparing a composition comprising a mixture or a reaction product obtained by combining a first olefin polymerization catalyst, a second olefin polymerization catalyst capable of preparing a polymer different in chemical or physical properties from the polymer prepared by the first olefin polymerization catalyst under the same polymerization conditions, and a chain shuttling agent, and of bringing ethylene and α-olefin into contact with said composition under addition polymerization condition.

The above-described addition polymerization is preferably performed by applying a continuous solution polymerization method. In the continuous solution polymerization method, catalyst components, chain shuttling agents, monomers, optionally solvents, adjuvants, scavengers and polymerization aids are continuously fed into a reaction zone from which the polymer product is continuously discharged. The length of the block can be changed by controlling the ratio and the type of catalyst, the ratio and the type of chain shuttling agent, the polymerization temperature, and the like. Other detailed conditions in the synthesis method of the (B) olefin block copolymer are disclosed in Japanese Patent Application Laid-Open Publication No. 2007-529617, which the contents of the disclosure can be adopted as needed.

The α-olefin constituting the soft segment of the (B) olefin block copolymer in the present invention is a linear or branched α-olefin having 3 to 30 carbons, preferably 4 to 20 carbons, and more preferably 4 to 8 carbons, and examples thereof include propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-dodecene, 1-octadecene, and 1-eicosene. Among these, the case where 1-octene is mainly used is preferable from the viewpoint of compatibility and slidability, sliding durability, bend-whitening resistance, and extrusion workability.

From the viewpoint of the effect of the present invention, the hard segment is a crystalline block mainly composed of ethylene and containing 1-octene, the soft segment is an amorphous block mainly composed of 1-octene and ethylene with a higher 1-octene content ratio than the hard segment, and each block has a multi-block structure in which two or more and preferably three or more blocks are alternately connected.

The ethylene content is preferably 25 to 97%, more preferably 40 to 96%, and even more preferably 55 to 95% from the viewpoint of the effect of the present invention.

The melt index (ASTM D1238, 190° C., 2.16 kg) of the (B) olefin block copolymer is preferably 0.5 to 15 g/10 min and more preferably 0.5 to 10 g/10 min.

The (B) olefin block copolymer has a density (ASTM D792) of preferably 0.860 to 0.930 g/cm$^3$ and more preferably 0.865 to 0.890 g/cm$^3$.

The (B) olefin block copolymer preferably has a hardness (ASTM D2240, Shore A) of 50 to 98 and more preferably 50 to 90.

The (B) olefin block copolymer preferably has a compression set (JIS K6262) of 75 or less at a measurement temperature of 100° C.

The melting point of the (B) olefin block copolymer as measured by DSC is preferably from 110 to 125° C. and more preferably from 115 to 123° C. in view of slidability, sliding durability, bend-whitening resistance, and extrusion workability.

Here, the melting point measured by DSC is a peak top melting point obtained by a differential scanning calorimeter (DSC), and specifically, it is a value obtained by measuring and weighing out a sample amount of 10 mg using DSC, keeping the sample amount at 190° C. for 5 minutes, subsequently crystallizing the sample amount at a temperature drop rate of 10° C./min to −10° C., keeping the sample amount at −10° C. for 5 minutes, and subsequently measuring the sample amount at a temperature elevation rate of 10° C./min to 200° C.

The blending amount of the (B) olefin block copolymer is usually 15 to 35% by mass, preferably 15 to 30% by mass, and more preferably 20 to 30% by mass, based on the total mass of the component (A) above. When the blending amount of the (B) olefin block copolymer is within the above range, the slidability can be improved.

<(C) Silane Coupling Agent>

The (C) silane coupling agent is a silane compound having at least two different reactive groups: a hydrolyzable group (for example, an alkoxy group such as a methoxy group or an ethoxy group; an acyloxy group such as an acetoxy group; a halogen group such as a chloro group) and an organic functional group (for example, an amino group, a vinyl group, an epoxy group, a methacryloxy group, an acryloxy group, an isocyanate group). The (C) silane coupling agent performs silane-grafting of a polymer component comprising (A) a high-density polyethylene and (B) an olefin block copolymer, thereby attaining good slidability, sliding durability, bend-whitening resistance, and extrusion workability. Even without performing silane-crosslinking, silane-grafting allows sufficient exertion of the sliding characteristics of silane, and since post-processing (water treatment) required for silane-crosslinking becomes unnecessary, use of the agent is economically and industrially excellent. Although sufficient slidability can be imparted without performing silane-crosslinking; in the case where the slidability are to be further improved by crosslinking afterwards, the (C) silane coupling agent works to graft onto a polymer component comprising (A) a high-density polyethylene and (B) an olefin block copolymer to form a crosslinking point at the time of post-treatment with hot water i.e. the so-called water crosslinking treatment.

Therefore, by melt-kneading the sliding material composition according to the present invention, which comprises (A) a high-density polyethylene, (B) an olefin block copolymer, and (C) a silane coupling agent, it is possible to provide a molded article having good slidability, sliding durability, bend-whitening resistance, and extrusion workability.

Examples of the (C) silane coupling agent include vinyl-based silane coupling agents (silane compounds having vinyl groups and hydrolyzable groups), methacrylic silane coupling agents (silane compounds having methacryloxy groups and hydrolyzable groups), acrylic silane coupling agents (silane compounds having acryloxy groups and hydrolyzable groups), epoxy-based silane coupling agents (silane compounds having epoxy groups and hydrolyzable groups), amino-based silane coupling agents (silane compounds having amino groups and hydrolyzable groups), and mercapto-based silane coupling agents (silane compounds having mercapto groups and hydrolyzable groups), and one of these can be used alone or two of these in combination. Among these, vinyl-based silane coupling agents are preferred from the viewpoint of slidability, sliding durability, bend-whitening resistance, and extrusion workability.

Examples of the vinyl-based silane coupling agent include vinyltrimethoxysilane, vinyltriethoxysilane, vinyltris(βmethoxyethoxy)silane, vinyltriacetoxysilane, vinyl-tris(n-butoxy)silane, vinyl-tris(n-pentoxy)silane, vinyl-tris(n-hexoxy)silane, vinyl-tris(n-heptoxy)silane, vinyl-tris(n-octoxy)silane, vinyl-tris(n-dodecyloxo)silane, vinyl-bis(n-butoxy)methylsilane, vinyl-bis(n-pentoxy)methylsilane, vinyl-bis(n-hexoxy)methylsilane, vinyl-(n-butoxy)dimethylsilane, and vinyl-(n-pentoxy)dimethylsilane.

The blending amount of the (C) silane coupling agent is usually 1 to 6 parts by mass, preferably 2.5 to 4.5 parts by mass, more preferably 2.0 to 4.0 parts by mass, with respect to the total of 100 parts by mass of the components: (A) high-density polyethylene and (B) olefin block copolymer. When the amount of the (C) silane coupling agent is within the above range, the (A) high-density polyethylene and the (B) olefin block copolymer can be sufficiently grafted to improve the slidability, sliding durability, bend-whitening resistance, and extrusion workability.

<Other Ingredients>

The sliding material composition or the sliding molded article according to the present invention may contain optional components other than the above-described components to the extent the effects of the invention are not impaired.

<(D) Silicone Powder>

As described above, the sliding material composition according to the present invention achieves the same level of slidability in the molded article obtained by melt kneading as a sliding member containing a conventional silicone-based powder; however (D) a silicone powder may be further contained in order to improve the slidability more. As the silicone powder (D), a known silicone powder can be used without limitation, and a commercially available silicone powder can also be used. For example, use can be made to silicone powders commercially available from Nikko Rika Corporation as NH-RASN06, MSP-TKN04, etc. and from Nissin Chemical Industry Co., Ltd. as Chaline R-175S, R-181S, etc.

The content of the optional component (D) silicone powder is not particularly limited, and is usually 2 to 10% by mass, preferably 3 to 7% by mass, in a sliding material composition comprising the (A) high-density polyethylene, the (B) olefin block copolymer, and the (C) silane coupling agent, or a sliding molded article from the viewpoint of improving slidability while maintaining a good appearance during extrusion molding.

<(E) Organic Peroxide>

Further, for example, (E) an organic peroxide may be contained in order to accelerate the grafting of the polymer component of the present invention comprising the (A) high-density polyethylene and the (B) olefin block copolymer, by the (C) silane coupling agent to realize good grafting. Addition of the organic peroxide generates radicals when the sliding material composition is melt-kneaded, and the radicals react in a chain manner to graft the above polymer components.

There is no particular limitation to the (E) organic peroxide, as long as it generates radicals, examples thereof including dicumyl peroxide, di-t-butyl peroxide, 2,5-dimethyl-2,5-di-(t-butylperoxy)hexane, 2,5-dimethyl-2,5-bis(t-butylperoxy)hexyne-3, 1,3-bis(t-butyl peroxyisopropyl)benzene, 1,1-bis(t-butyl peroxy)-3,3,5-trimethylcyclohexane, n-butyl-4,4-bis(t-butyl peroxy)valerate, benzoyl peroxide, p-chlorobenzoyl peroxide, 2,4-dichlorobenzoyl peroxide, t-butyl peroxy benzoate, t-butyl peroxy isopropyl carbonate, diacetyl peroxide, lauroyl peroxide, and t-butyl cumyl peroxide, and one of these can be used alone or two more of these in combination.

As the (E) organic peroxide suitably used in the present invention, preferred among the above are 2,5-dimethyl-2,5-di-(t-butyl peroxy)hexane, 2,5-dimethyl-2,5-bis(t-butyl peroxy)hexyne-3, and dicumyl peroxide, from the viewpoint of the odor, coloring property, and scorch safety of the composition.

Examples of the commercial available (E) organic peroxide include "PERHEXA 25B (product name)", "PERHEXYNE 25B (product name)", and "PERCUMYL D (product name)" from NOF Corporation.

The amount of the (E) organic peroxide is usually 0.02 to 0.20 parts by mass and preferably 0.04 to 0.12 parts by mass, based on 100 parts by mass of the total of the components (A) and (B).

<(F) Silanol Condensation Catalyst>

In order to crosslink the above-described molded article obtained by silane-grafting, (F) a silanol condensation catalyst may be included. The (F) silanol condensation catalyst promotes and catalyzes crosslinking (dehydration condensation reaction between the silanols) the crosslinking points formed by grafting the (C) silane coupling agent onto the (A) high-density polyethylene and the (B) olefin block copolymer at the time of post-treatment with warm water, i.e. water crosslinking treatment of the silane-grafted molded article, thereby forming silane-crosslinking. Even when the (F) silanol condensation catalyst is not applied to the silane-grafted molded article, the alkoxy group of the grafted silane is hydrolyzed by moisture to crosslink the silane-grafted molded article; however, the crosslinking reaction is accelerated by using the catalyst, producing the silane-crosslinked molded article efficiently.

The (F) silanol condensation catalyst used in the present invention is not particularly limited, as long as it can accelerate or catalyze the dehydration condensation reaction between the silanols; examples thereof including dibutyltin dilaurate, dibutyltin diacetate, dibutyltin dioleate, dioctyltin laurate, stannous acetate, lead naphthenate, cobalt naphthenate, zinc caprylate, iron 2-ethylhexanoate, titanic acid ester, tetrabutyl titanate ester, tetranonyl titanate ester, bis (acetylacetonitrile)diisopropyl titanium ethylamine complex, hexylamine complex, dibutylamine complex, and pyridine complex, and one of these can be used alone or two or more of these in combination.

The amount of the (F) silanol condensation catalyst to be applied may be, without particular limitation, normally 0.005 to 0.3 parts by mass and preferably 0.008 to 0.2 parts by mass, with respect to the total of 100 parts by mass of the components: (A) high-density polyethylene and (B) olefin block copolymer, from the viewpoint of improving slidability, sliding durability, bend-whitening resistance, and extrusion workability.

As means for applying the (F) silanol condensation catalyst to the sliding material composition, the (F) silanol condensation catalyst may be blended into the sliding material composition together with a suitable liquid substance, for example, process oils such as paraffin oil, organic solvents such as ethyl acetate or toluene, liquid paraffin, and the like, or else a masterbatch containing (F) the silanol condensation catalyst may be prepared and the masterbatch may be blended into the sliding material composition. As another application means, the molded article may be obtained by dynamically heat-treating the sliding material composition, and a solution containing the (F) silanol condensation catalyst in a suitable liquid substance, for example, organic solvents such as methanol, ethanol, isopropyl alcohol, ethyl acetate, toluene, or process oils such as paraffin oil, may be applied to the surface of the molded article.

The optional resin used in the masterbatch is not particularly limited, and the (A) high-density polyethylene and/or the (B) olefin block copolymer are preferred from the viewpoint of compatibility with the sliding material composition of the present invention. The above-described masterbatch may further contain additives such as softeners, plasticizers, pigments, fillers, lubricants, antioxidants, thermal stabilizers, weather-resistant stabilizers, release agents, antistatic agents, metal deactivators, and surfactants, as needed. The melt flow rate (160° C., 10 kg) of the masterbatch is preferably 3 g/10 min or more and more preferably 25 g/10 min or more. The melt flow rate of the masterbatch is preferably higher than the melt flow rate of the sliding material composition.

When commercially available (A) high-density polyethylene and (B) olefin block copolymer described above are used, they can be usually obtained in the form of pellets. On the other hand, the (C) silane coupling agent and the optional (E) organic peroxide are often liquid at room temperature. Therefore, in manufacturing the sliding material composition according to the present invention, the liquid component is usually fed into a melt-kneading apparatus using a liquid adding apparatus in order to suppress/prevent separation and unevenness of the pellet-form solid component and the liquid component. If it is not to use the liquid adding apparatus, a filler or a lubricant may be added in order to suppress/prevent separation and unevenness of the solid component and the liquid component. The filler or the lubricant contained in the sliding material composition allows a part or all of the liquid component to be fed into the melt-kneading apparatus together with the pellet-form solid component.

There is no particular limitation to such fillers and lubricants, and known fillers and lubricants can be used, examples thereof including ethylene-bisstearic acid amide, calcium carbonate, magnesium carbonate, magnesium oxide, magnesium hydroxide, barium sulfate, talc, mica, clay, and the like, and one of these can be used alone or two or more of these in combination.

The blending amount of the filler or the lubricant is usually, without particular limitation, 0 to 100 parts by mass and preferably 1 to 90 parts by mass, based on the total of 100 parts by mass of the (A) high-density polyethylene and the (B) olefin block copolymer.

The sliding material composition according to the present invention may further include, as desired, a thermoplastic resin other than the (A) high-density polyethylene and the (B) olefin block copolymer, or an additive such as a softening agent, a plasticizer, a pigment, an antioxidant, a thermal stabilizer, a weather-resistant stabilizer, a mold-releasing agent, an antistatic agent, a metal deactivator, and a surfactant, to the extent the effects of the present invention are not impaired.

<Sliding Molded Article>

The sliding molded article according to the present invention is obtained by applying a silane coupling agent (C) to the polymer component comprising the (A) high-density polyethylene the (B) olefin block copolymer according to the present invention. The (C) silane coupling agent has at least two kinds of different reactive groups: a hydrolyzable group and an organic functional group in the molecule. Therefore, the base component can be efficiently grafted as it has functional groups that bond to both the organic material and the inorganic material. That is, as will be described later, a molded article in which the polymer component is grafted onto the silane coupling agent can be obtained by dynamically heat-treating the sliding material composition of the present invention using a melt kneader and the like. As for the (C) silane coupling agent used in the present invention, one of the above specific examples may be used alone or two or more thereof in combination.

In the present invention, the silane-grafted molded article above may be subjected to a hot water treatment, or the silane-grafted molded article may be subjected to silane-crosslinking by applying the (F) silanol condensation catalyst. The (F) silanol condensation catalyst promotes and catalyzes crosslinking (dehydration condensation reaction between the silanols) of crosslinking points formed by grafting the (C) silane coupling agent onto the (A) high-density polyethylene and the (B) olefin block copolymer at the time of post-treatment with hot water, i.e., water cross-linking treatment, of the silane-grafted molded article, thereby further improving slidability, sliding durability, bend-whitening resistance, and extrusion workability. In the silane-grafted molded article, the alkoxy group of the grafted silane is crosslinked by hydrolysis due to moisture even when the (F) silanol condensation catalyst is not applied, and by using this, the crosslinking reaction is promoted, and the silane-crosslinked composition can be efficiently produced.

<Manufacturing Method of Sliding Molded Article>

The molded article of the present invention can be obtained by dynamically heat-treating the sliding material composition containing the above-described components (A) to (C) and optional components to be used as needed using any melt kneader to form any shape. The term "dynamically heat-treating" as used herein means melt-kneading under a temperature condition in which the decomposition of the above-described component (E) organic peroxide occurs significantly. Examples of the melt kneader above include a single-screw extruder, a twin-screw extruder, a roll, a mixer, various kinds of kneader, and a device of a combination thereof. The temperature condition of the melt-kneading above may be normally a temperature equal to or more than one-minute half-life temperature of the component (E), preferably a temperature equal to or more than 5° C. higher than the one-minute half-life temperature of the component (E). The time condition of the melt-kneading may be usually 30 seconds or more and preferably 2 minutes or more.

In order to apply the above-described (F) silanol condensation catalyst to a molded article to form a crosslinked molded article, the above-described sliding material composition or a molded article in which a silane coupling agent is grafted onto the polymer components by dynamically heat-treating the sliding material composition can be used, and a crosslinked molded article can be obtained by molding the slide material composition into any shape in the above-described manner using any molding machine, and carrying out post-treatment with hot water, i.e. water crosslinking treatment. The temperature condition of the water crosslinking treatment above may be normal temperature (20° C.) to 150° C. and preferably 50 to 90° C. The time condition of the water crosslinking treatment is usually 10 seconds to 1 week and preferably 1 minute to 3 days. It can also be brought into contact with water under pressure. In order to further improve the wettability of the molded article, the water may contain a wetting agent or a surfactant, a water-soluble organic solvent, or other additives. The water is not limited to liquid water, and may be in a gas state (water vapor or water in the air). Examples of the molding machine above include an extrusion molding machine, an injection molding machine, and a blow molding machine.

The sliding molded article of the present invention has a slidability as good as that of a resin containing particles such as a silicone-based powder and has flexibility and moldability, and therefore can be formed into a desired shape by a blow molding method, an extrusion molding method, an injection molding method, a thermoforming method, an elasto-welding method, a compression molding method, or the like. The molding conditions are not particularly limited.

<Measurement of Gel Fraction>

In the sliding molded article according to the present invention, the components (A) and (B) above are partially crosslinked in the presence of the component (C) above when the sliding material composition according to the present invention is heated and kneaded. The crosslinking degree of the sliding molded article according to the present invention can be represented by the gel fraction of the thermoplastic resin component constituting the molded article (i.e., the thermoplastic resin component obtained by crosslinking (A) the high-density polyethylene and the (B) olefin block copolymer). 1 g of a sample is wrapped in a 100-mesh metallic gauze and extracted in boiling xylene for 10 hours with a Soxhlet extractor, and the gel fraction can be expressed as the ratio of the mass of the residual solid to 1 g of the sample. In the present invention, the crosslinking degree is normally 1 to 60% by mass, preferably 10 to 40% by mass, and more preferably 15 to 30% In mass gel fraction. The effect of the present invention can be fully exhibited within this range.

<Si Content of Sliding Material Composition and Sliding Molded Article>

A silane-grafted molded article (sliding molded article) obtained by dynamically heat-treating the sliding material composition is characterized by containing Si units in an amount of usually 0.1 to 15% by mass and preferably 0.1 to 10% by mass with respect to the molded article. The Si content in the sliding molded article of the present invention means a value measured by the following method.

<Measurement Method of Si Content>

Examples of the method for measuring the Si content include an analysis method in which a measurement solution is prepared by a dry decomposition method, a wet decomposition method, a melting method, or a decomposition method by combining these methods as a pretreatment step of the sliding material composition and the sliding molded article, and the measurement solution is measured and calculated by atomic absorption spectrometry, ICP emission spectrometry, ICP mass spectrometry, or the like. In the present invention, a test solution is prepared using a microwave decomposition apparatus, and the Si content can be calculated by a calibration curve method using an ICP emission analysis apparatus. Specifically, the Si content in the sliding material composition and the sliding molded article is measured as follows.

First, 0.20 g of a sample collected from the sliding material composition and/or the sliding molded article is put into a decomposition container (XP-1500 Plus for MARS5, from Astech Co., Ltd.), 5 ml of nitric acid for ultramicroanalysis is added thereto, and the mixture is allowed to stand in room temperature for 30 minutes. Next, the sample is decomposed by a microwave decomposition apparatus (MARS5, from Astech Co., Ltd.). The decomposition conditions are as follows: 10 minutes at a microwave power of 300 W, 5 minutes at rest, and 10 minutes at a microwave power of 300 W. After allowing to stand at room temperature for 30 minutes, the decomposition solution is transferred to a 20 ml volumetric flask, 2 ml of 0.02 ppm yttrium solution is added, and purified water was used to dilute to make a test solution. The Si content is calculated by the calibration curve method using an ICP emission spectrometer (SPECTRO ARCOS, from Hitachi High-Tech Science Co., Ltd.) and a calibration curve method silicon standard solution (from Fujifilm Wako Pure Chemical Corporation Co., Ltd., 1,000 ppm for atomic absorption spectrometry).

<Application of Sliding Molded Article>

The use of the obtained molded article for a sliding member is not particularly limited, and can be suitably used as an alternative application for a resin containing particles such as a silicone-based powder. Examples of the automotive components include weather strips, glass runs, lighting gaskets, 3D exchange blow clean air ducts, flow seal hinge covers, belly pans (Robotech extrusion gaskets), cup holders, side brake grips, shift knob covers, seat adjustment knobs, IP skins, flapper door seals, wire harness grommets, rack and pinion boots, suspension cover boots (strut cover boots), glass guides, inner belt line seals, roof guides, trunk lid seals, molded quarter wind gaskets, corner moldings, glass encapsulations (Robotech extrusion), food seals, glass encapsulations (injection molding), glass run channels, and secondary seals. Examples of the building member include curtain wall gaskets of tall buildings, window frame seals, adhesion to metals/reinforcing fibers, parking deck seals, expansion joints, expansion joints for earthquake countermeasures, housing window door seals (for example, co-extrusion), housing door seals, and handrail skins. Other industrial parts include walking mats (sheets), rubber feet, washing machine drain hoses (two-color molding with PP, etc.), washing machine lid seals, air conditioner motor mounts, drain pipe seals (two-color molding with PP, etc.), riser tubes (PVC, etc.), caster wheels, printer rolls, duct hoses, wires and cables, syringe gaskets, etc. In addition, the present invention can be preferably used as commodities and parts, for speaker surrounds, hair brush grips, razor grips, cosmetic grips and feet, toothbrush grips, commodity brush grips, broom tips, kitchen grips, measuring spoon grips, branch cutting scissors grips, glass heat-resistant container lids, gardening goods grips, scissors grips, stapler grips, computer mouses, golf bag parts, wall coated iron grips, chain saw grips, screwdriver grips, hammer grips, electric drill grips, polishing machine grips, alarm clock, and the like.

EXAMPLES

Hereinafter, the present invention will be described with reference to the Examples, without the present invention being limited thereby.

The following materials were prepared.

(1) Component A: High-Density Polyethylene

HI-ZEX 5305E (manufactured by Prime Polymer Co., Ltd., density (JIS K 7112 (ISO 1183) 0.951 g/cm$^3$, melt index (JIS K 7210 (ISO 1133), 190° C., 2.16 kg)=0.8 g/10 min)

HI-ZEX 6300M (manufactured by Prime Polymer Co., Ltd., density (JIS K 7112 (ISO 1183) 0.951 g/cm$^3$, melt index (JIS K 7210 (ISO 1133), 190° C., 2.16 kg)=0.11 g/10 min)

(2) Component A1: Powder Raw Material (High-Density Polyethylene Powder)

Sunfine SH810 (manufactured by Asahi Kasei Corporation, powdered high-density polyethylene, density (JIS K 7112 (ISO 1183) 0.958 g/cm$^3$, melt index (JIS 7210 (ISO 1133), 190° C., 2.16 kg)=0.08 g/10 min)

(3) Component B: Olefin Block Copolymer

INFUSE D9100 (manufactured by Dow Chemical Company, melt index (ASTM D1238, 190° C., 2.16 kg)=1 g/10 min), density (ASTM D792) 0.877 g/cm$^3$, hardness (ASTM D2240, Shore A) 75, melting point (DSC method) 120° C.

INFUSE D9817 (manufactured by Dow Chemical Company, melt index (ASTM D1238, 190° C., 2.16 kg)=15 g/10 min), density (ASTM D792) 0.877 g/cm$^3$, hardness (ASTM D2240, Shore A) 71, melting point (DSC method) 120° C.

INFUSE D9530 (manufactured by Dow Chemical Company, melt index (ASTM D1238, 190° C., 2.16 kg)=5 g/10 min), density (ASTM D792) 0.887 g/cm$^3$, hardness (ASTM D2240, Shore A) 83, melting point (DSC method) 119° C.

(4) Component C: Silane Coupling Agent

KBM-1003 (manufactured by Shin-Etsu Chemical Co., Ltd., vinyltrimethoxysilane)

(5) Component D: Silicone Powder

NH-RASN06 (manufactured by Nikko Rika Co., Ltd., methyl siloxane network polymer, Kompeito (confeito)-form)

(6) Component E: Organic Peroxide

Perhexyne 25B (manufactured by NOF CORPORATION, 2,5-dimethyl-2,5-bis(t-butylperoxy)hexyne-3)

(7) Component F: Silanol Condensation Catalyst

NEOSTAN U-810 (manufactured by Nitto Chemical Industry Co., Ltd., dioctyl tin dilaurate)

(8) Other Ingredients:

NEO-ZEX 2015M (manufactured by Prime Polymer Co., Ltd., low-density polyethylene, density (JIS K 7112 (ISO 1183) 0.922 g/cm$^3$, melt index (JIS K 7210 (ISO 1133), 190° C., 2.16 kg)=1.2 g/10 min)

Kao Wax EB-P (Made by Kao Corporation, ethylene-bisstearic acid amide)

IRGANOX 1010 (manufactured by BASF, hindered phenolic antioxidant)

IRGAFOS 168 (manufactured by BASF, phosphorous antioxidant)

<Preparation of Silanol Condensation Catalyst Masterbatch>

The above-described materials were dry-blended using a blender according to the composition shown in Table 1 below, subsequently supplied to an extruder, and melt-kneaded under the condition of a die exit resin temperature of 160° C. to obtain a silanol condensation catalyst masterbatch (MB). The numerical values in the table represent parts by mass. The silanol condensation catalyst content in the silanol condensation catalyst MB is 4.7% by mass.

TABLE 1

| Component | | Masterbatch |
|---|---|---|
| High-density polyethylene | HI-ZEX 5305E | 80 |
| Olefin Bock Copolymer | INFUSE D9530 | 20 |
| Lubricant | Kao Wax EB-P | 0.1 |
| Antoxdant | IRGANOX 1010 | 0.1 |
| | IRGAFOS 168 | 0.1 |
| Silanol Condensation Catalyst | Neostann U-810 | 5 |

<Preparation of Sliding Material Composition>

The above-described components were dry-blended by using a blender according to the compositions shown in Tables 2 and 3 below, subsequently supplied to the screw root of the extruder, and melt-kneaded under the following conditions to obtain Sliding molded articles 1 to 21. The numerical values in the table represent parts by mass.

<Extrusion Conditions>
Instrument: 20 mm extruder
Screw: full flight
Die: 25×0.5 mm thick die
Temperature: C1=200° C., C2=220° C., C3=220° C., D=210° C.
Screw rotation speed: 20 rpm <Measurement of Si Content>

The content of Si contained in the Sliding molded articles 1 to 21 prepared as described above was measured, and the results are shown in Tables 2 and 3. The Si content was measured in the following manner.

<Measurement Method of Si Content>

The test solution was prepared using a microwave decomposition apparatus, and calculation was done by the calibration curve method using an ICP emission spectrometer.

0.20 g of a sample was placed in a decomposition container (XP-1500 Plus for MARS5, from Astech Co., Ltd.), and subsequently, 5 ml of nitric acid for ultra-microanalysis was added, and the mixture was left to stand in room temperature for 30 minutes. Decomposition was carried out by a microwave decomposition device (MARS5, from Astech Co., Ltd.). The decomposition conditions were as follows: 10 minutes irradiation at microwave power of 300 W, 5 minutes at rest, and further 10 minutes irradiation at microwave power of 300 W. After this operation and after allowing to stand at room temperature for 30 minutes, the decomposition solution was transferred to a 20 ml volumetric flask, and 2 ml of 0.02 ppm yttrium solution was added, and subsequently dilution with purified water was conducted to make a test solution. The Si content was calculated by a calibration curve method using an ICP emission spectrometer (SPECTRO ARCOS from Hitachi High-Tech Science Co., Ltd.) and a calibration curve silicon standard solution (from Fujifilm Wako Pure Chemical Corporation Co., Ltd.; 1,000 ppm for atomic absorption spectrometry).

TABLE 2

| | | | Sliding Material Composition (parts by mass) | | | | | | | | | | | | | |
|---|---|---|---|---|---|---|---|---|---|---|---|---|---|---|---|---|
| Component | | | 1 | 2 | 3 | 4 | 5 | 6 | 7 | 8 | 9 | 10 | 11 | 12 | 13 | 14 |
| Formulation of Sliding Material Composition | (A) High-density polyethylene | HI-ZEX 5305E | 80 | 40 | — | 75 | 70 | 80 | 75 | 60 | 68 | 90 | 80 | — | 80 | 80 |
| | | HI-ZEX 6300M | — | 40 | 80 | — | — | — | — | — | — | — | — | — | — | — |
| | | NEO-ZEX 2015M | — | — | — | — | — | — | — | — | — | — | — | 80 | — | — |
| | | Sunfine SH810 | — | — | — | 5 | 10 | — | 5 | — | — | — | — | — | — | — |
| | (B) Olefin Block Copolymer | INFUSE D9100 | 20 | 20 | 20 | 20 | 20 | 20 | 20 | 40 | 32 | 10 | — | 20 | 20 | 20 |
| | | INFUSE D9817 | — | — | — | — | — | — | — | — | — | — | 20 | — | — | — |
| | (E) Organic Peroxide | Perhexyne 25B | 0.08 | 0.08 | 0.08 | 0.08 | 0.08 | 0.08 | 0.08 | 0.08 | 0.08 | 0.08 | 0.08 | 0.08 | 0.08 | 0.08 |
| | (C) Silane Coupling Agent | KBM-1003 | 3.5 | 3.5 | 3.5 | 3.5 | 3.5 | 3.5 | 3.5 | 3.5 | 3.5 | 3.5 | 3.5 | 3.5 | 0.5 | 2.5 |
| | (F) Silanol Condensation Catalyst MB | Neostann U-810 | — | — | — | — | — | — | — | — | — | — | — | — | — | — |
| | (D) Silicone Powder | NH-RASN 06 | — | — | — | — | — | 5 | 5 | 5 | — | — | — | — | — | — |
| | Lubricant | Kao Wax EB-P | 0.1 | 0.1 | 0.1 | 0.1 | 0.1 | 0.1 | 0.1 | 0.1 | 0.1 | 0.1 | 0.1 | 0.1 | 0.1 | 0.1 |
| | Antioxidant | IRGANOX 1010 | 0.1 | 0.1 | 01 | 0.1 | 0,1 | 0.1 | 0.1 | 0.1 | 0.1 | 0.1 | 0.1 | 0.1 | 0.1 | 0.1 |
| | | IRGAFOS 168 | 0.05 | 0.05 | 0.05 | 0.05 | 0.05 | 0.05 | 0.05 | 0.05 | 0.05 | 0.05 | 0.05 | 0.05 | 0.05 | 0.05 |
| Si Content in Sliding Molded Article (Si weight %) | | | 0.64 | 0.64 | 0.64 | 0.64 | 0.64 | 2.5 | 2.5 | 2.5 | 0.64 | 0.64 | 0.64 | 0.64 | 0.09 | 0.45 |

TABLE 3

| | Component | | Sliding Material Composition (parts by mass) | | | | | | |
|---|---|---|---|---|---|---|---|---|---|
| | | | 15 | 16 | 17 | 18 | 19 | 20 | 21 |
| Formulation of Sliding Material Composition | (A) High-density polyethylene | HI-ZEX 5305E | 80 | 80 | 80 | 80 | 80 | 80 | 80 |
| | | HI-ZEX 6300M | — | — | — | — | — | — | — |
| | | NEO-ZEX 2015M | — | — | — | — | — | — | — |
| | | Sunfine SH810 | — | — | — | — | — | — | — |
| | (B) Olefin Block Copolymer | INFUSE D9100 | 20 | 20 | 20 | 20 | 20 | 20 | 20 |
| | | INFUSE D9817 | — | — | — | — | — | — | — |
| | (E) Organic Peroxide | Perhexyne 25B | 0.08 | 0.08 | 0.04 | 0.12 | — | 0.08 | 0.08 |
| | (C) Silane Coupling Agent | KBM-1003 | 4.5 | 7 | 3.5 | 3.5 | — | 3.5 | 3.5 |
| | (F) Silanol Condensation Catalyst MB | Neostann U-810 (catalyst amount) | — | — | — | — | — | — | 3.2 (0.15) |
| | (D) Silicone Powder | NH-RASN 06 | — | — | — | — | — | — | — |
| | Lubricant | Kao Wax EB-P | 0.1 | 0.1 | 0.1 | 0.1 | 0.1 | 0.1 | 0.1 |
| | Antioxidant | IRGANOX 1010 | 0.1 | 0.1 | 0.1 | 0.1 | 0.1 | 0.1 | 0.1 |
| | | IRGAFOS 168 | 0.05 | 0.05 | 0.05 | 0.05 | 0.05 | 0.05 | 0.05 |
| Si Content in Sliding Molded Article (Si weight %) | | | 0.81 | 1.23 | 0.64 | 0.64 | 0 | 0.64 | 0.62 |

TABLE 4

| | | Examples | | | | | | | | | | | | | | | Comparative Examples | | | | | |
|---|---|---|---|---|---|---|---|---|---|---|---|---|---|---|---|---|---|---|---|---|---|---|
| Component | | 1 | 2 | 3 | 4 | 5 | 6 | 7 | 8 | 9 | 10 | 11 | 12 | 13 | 14 | 15 | 1 | 2 | 3 | 4 | 5 | 6 |
| Sliding Material Composition | | 1 | 2 | 3 | 4 | 5 | 6 | 7 | 9 | 11 | 14 | 15 | 17 | 18 | 20 | 21 | 8 | 10 | 12 | 13 | 16 | 19 |
| Sliding Molded Article | Hot water treatment | — | — | — | — | — | — | — | — | — | — | — | — | — | ○ | ○ | — | — | — | — | — | — |
| | Catalyst addition | — | — | — | — | — | — | — | — | — | — | — | — | — | — | ○ | — | — | — | — | — | — |

Compositions 20 and 21 were immersed in hot water at a temperature of 80° C. for 12 hours to accelerate the reaction, thereby obtaining Crosslinked molded articles 20 and 21 for each test piece.

<Measurement of Slidability>

The Molded articles 1 to 21 obtained as described above were cut into 10×60×0.5 mm extruded tapes to prepare test samples. The obtained test samples were stuck to an ASTM surface jig with a double-sided tape in parallel to the friction direction, and a slidability test was carried out under the following conditions. The measurement results of the dynamic friction coefficient obtained are shown in Tables 5 and 6 below.
  Test machine: HEIDON tribogear friction measuring machine, manufactured by Shinto Scientific Co., Ltd.
  Friction material: glass surface
  Friction jig: ASTM Flat Jig
  Vertical load: 1000 g
  Friction speed: 100 mm/sec
  Moving distance: 60 mm <Measurement of Sliding Durability>

The test samples of the Molded articles 1 to 21 obtained as described above were measured for the sliding durability under the same conditions as in the slidability measurement test described above, by measuring the dynamic friction coefficient after rubbing against the glass surface 1000 times. The measurement results of the dynamic friction coefficient obtained are shown in Tables 5 and 6 below.

<Evaluation of Bend-Whitening Property>

The Molded articles 1 to 21 obtained as above are extruded tapes having a thickness of 0.5 mm. The bend-whitening property was observed by visually confirming the fold when the extruded tape was folded 180 degrees and brought back. The temperature at the time of measurement was room temperature (23° C.), and the holding time in the folded state was about 1 second. Further, in order to make the whitening easily visible, samples to which 2 parts by mass of carbon black was added were used for evaluation. The evaluation criteria were as follows.
  ⊚: The color of the bent line returned.
  ○: The bent line became slightly white.
  X: The bent line turned white.

The evaluation results are as shown in Tables 5 and 6 below.

<Measurement of Extrusion Surface Roughness>

The extrusion surface roughness Rz of the Molded articles 1 to 21 obtained as above was measured in accordance with JIS B 0601 by a surface roughness measuring device, HANDYSURF E-35B (manufactured by TOKYO SEIMITSU CO., LTD. Co., Ltd.) at a measuring length of 4.0 mm. The measurement results are as shown in Tables 5 and 6 below.

TABLE 5

| | | Examples | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Slidability | Slidability | 0.20 | 0.10 | 0.07 | 0.18 | 0.15 | 0.12 | 0.08 | 0.27 | 0.18 | 0.26 | 0.20 | 0.25 | 0.18 | 0.08 | 0.06 |
| | Sliding Durability | 1.23 | 0.51 | 0.33 | 0.83 | 0.57 | 0.27 | 0.23 | 1.67 | 1.40 | 1.55 | 1.19 | 1.59 | 1.48 | 1.20 | 1.10 |
| Bend-whitening property | | ○ | ○ | ○ | ○ | ○ | ○ | ○ | ○ | ○ | ○ | ○ | ○ | ○ | ○ | ○ |
| Appearance | Extrusion Surface Roughness Rz (μm) | 5.4 | 14.8 | 19.2 | 6.6 | 11.9 | 8.6 | 9.4 | 3.7 | 4.1 | 5.0 | 7.9 | 4.9 | 14.3 | 5.7 | 6.3 |

TABLE 6

| | | Comparative Examples | | | | | |
|---|---|---|---|---|---|---|---|
| | | 1 | 2 | 3 | 4 | 5 | 6 |
| Slidability | Slidability | 0.35 | 0.17 | 0.52 | 0.30 | 0.20 | 0.31 |
| | Sliding Durability | n.d. | 1.14 | n.d. | n.d. | 1.17 | n.d. |
| Bend-whitening property | | ⊚ | X | ○ | ○ | ○ | ○ |
| Appearance | Extrusion Surface Roughness Rz (μm) | 2.2 | 6.6 | 4.5 | 3.8 | 21.2 | 4.5 |

※ In the Table, n.d. indicates "not detectable".

As is clear from the evaluation results shown in Tables 5 and 6, the sliding material compositions according to the present invention were excellent in all the slidability, sliding durability, bend-whitening property, and extrusion surface roughness.

Further, in comparison between the Examples, it can be seen that Example 7 is the best upon comprehensively judging the slidability, sliding durability, bend-whitening property, and extrusion surface roughness. In Example 7, a high-density polyethylene powder and a silicone powder are added in addition to the high-density polyethylene, olefin block copolymer, and silane coupling agent which are the essential components. From this result, it is understood that the sliding durability is improved by adding a high-density polyethylene powder and a silicone powder.

On the other hand, Comparative Example 1 has poor sliding durability because the content of the high-density polyethylene is less than the prescribed value, Comparative Example 2 has poor bend-whitening property because the content of the high-density polyethylene is higher than the specified value, Comparative Example 3 has poor slidability and sliding durability because it does not contain the high-density polyethylene at all, Comparative Example 4 has poor sliding durability because the content of the silane coupling agent is less than the prescribed value, Comparative Example 5 has poor extrusion surface roughness because the content of the silane coupling agent is higher than the prescribed value, and Comparative Example 6 has poor sliding durability because the silane coupling agent is not contained at all.

The invention claimed is:

1. A sliding material composition, comprising:
   a polymer component comprising:
      (A) a high-density polyethylene; and
      (B) an olefin block copolymer; and
      (C) a silane coupling agent;
   wherein the Si content is 0.1 to 15% by mass based on the mass of the entire sliding material composition, and
   wherein a crosslinking degree is 10 to 40% by mass in mass gel fraction.

2. The sliding material composition according to claim 1, wherein the polymer component comprises:
   (A) 65 to 85% by mass of the high-density polyethylene; and
   (B) 15 to 35% by mass of the olefin block copolymer.

3. The sliding material composition according to claim 1, wherein the (A) high-density polyethylene comprises (A1) a powder raw material.

4. The sliding material composition according to claim 1, further comprising (D) a silicone powder.

5. The sliding material composition according to claim 1, further comprising (F) a silanol condensation catalyst.

6. A sliding molded article comprising the sliding material composition according to claim 1.

7. A sliding member comprising the sliding molded article according to claim 6.

8. The sliding member according to claim 7 which is a member for an automobile or a member for a building.

* * * * *